United States Patent
Bergeron et al.

(10) Patent No.: US 8,487,807 B2
(45) Date of Patent: Jul. 16, 2013

(54) SYNTHETIC APERTURE IMAGING INTERFEROMETER

(75) Inventors: Alain Bergeron, Québec (CA); Linda Marchese, Québec (CA)

(73) Assignee: Institut National d'Optique, Quebec (CA)

( * ) Notice: Subject to any disclaimer, the term of this patent is extended or adjusted under 35 U.S.C. 154(b) by 295 days.

(21) Appl. No.: 12/933,016

(22) PCT Filed: Jun. 28, 2010

(86) PCT No.: PCT/CA2010/001009
§ 371 (c)(1),
(2), (4) Date: Sep. 16, 2010

(87) PCT Pub. No.: WO2012/000075
PCT Pub. Date: Jan. 5, 2012

(65) Prior Publication Data
US 2012/0229331 A1    Sep. 13, 2012

(51) Int. Cl.
*G01S 13/00* (2006.01)
(52) U.S. Cl.
USPC ............................... 342/25 C; 342/25 R
(58) Field of Classification Search
USPC .......................................................... 342/25
See application file for complete search history.

(56) References Cited

U.S. PATENT DOCUMENTS

| | | | |
|---|---|---|---|
| 5,608,405 A * | 3/1997 | Pritt | 342/25 C |
| 6,204,799 B1 * | 3/2001 | Caputi, Jr. | 342/25 R |
| 6,222,933 B1 * | 4/2001 | Mittermayer et al. | 382/109 |
| 7,728,757 B2 | 6/2010 | Cho | |
| 2004/0150547 A1 * | 8/2004 | Suess et al. | 342/25 A |
| 2008/0012751 A1 * | 1/2008 | Owens et al. | 342/62 |
| 2008/0084551 A1 | 4/2008 | Harnisch | |
| 2010/0109938 A1 | 5/2010 | Oswald et al. | |

FOREIGN PATENT DOCUMENTS

| | | |
|---|---|---|
| EP | 1517158 | 3/2005 |
| WO | WO2006072813 | 7/2006 |

OTHER PUBLICATIONS

International Search Report dated Mar. 14, 2011 issued by the International Bureau (WIPO) in connection with the corresponding International patent application No. PCT/CA2010/001009.
Marchese et al., "A real-time high-resolution optical SAR processor", Proceeding of SPIE, vol. 7669, 2010, pp. 1-7.
Marchese et al., "Full scene SAR processing in seconds using a reconfigurable optronic processor", IEEE, 2010, pp. 1362-1364.
Orsomando et al., "SAR and Optical Data Fusion for Change Detection", Urban Remote Sensing Joint Event, IEEE, 2007.

(Continued)

*Primary Examiner* — Timothy A Brainard
(74) *Attorney, Agent, or Firm* — Alexandre Daoust

(57) ABSTRACT

There is described a method for generating a synthetic aperture image of a target area, comprising: receiving, from a synthetic aperture imaging system, first raw data representative of electromagnetic signals reflected by the target area and detected by the synthetic aperture imaging system according to a first angle of view; digitally combining the first raw data with second raw data, thereby obtaining combined data, the second raw data being representative of the electromagnetic signals reflected by the target area and detected by the synthetic aperture imaging system according to a second angle of view different from the first angle of view; and generating an interference pattern of the target data using the combined data.

13 Claims, 9 Drawing Sheets

OTHER PUBLICATIONS

Graham L C., "Synthetic Interferometer Radar for Topographic Mapping", Proceedings of IEEE 62, No. 2, Jun. 1974, pp. 763-768.

Ouchi et al., "Cross-Track Proposed Multi-Frequency SAR Interferometry: Comparisons with Optical Holographic Interferometry", IEEE, vol. 4, Issue 8, Aug. 1994, pp. 2263-2266.

Leith, Emmet N., "Quasi-Holographic Techniques in the Microwave Region", Proceedings of the IEEE, vol. 59, No. 9, Sep. 1971, pp. 1305-1323.

Kozma et al., "Tilted-plane optical processor", Applied Optics, vol. 11, No. 8, Aug. 1972, pp. 1766-1777.

Leith E. N., "Range-azimuth-coupling aberrations in pulse-scanned imaging systems", Journal of the Optical Society of Americas, vol. 63, No. 2, Feb. 1973, pp. 119-126.

Hecht E., "Optics", Addison-Wesley, Co. 1987, pp. 593-610.

Olmsted, Coert, "Alaska SAR Facility Scientific SAR User's Guide", Jul. 1993, pp. 1-53.

\* cited by examiner

SYNTHETIC APERTURE IMAGING INTERFEROMETER

CROSS-REFERENCE TO RELATED APPLICATIONS/PRIORITY CLAIM

This application is a national phase of PCT patent application serial number PCT/CA2010/001009 filed Jun. 28, 2010, designating the United States of America, now pending, the specification of which is hereby incorporated by reference.

TECHNICAL FIELD

The present invention relates to the field of synthetic aperture imaging systems, and more particularly to methods and apparatuses for generating a 3D interference pattern in a synthetic aperture imaging system.

BACKGROUND

Synthetic aperture radar (SAR) imaging systems are widely used in urban, aerial and space reconnaissance. Usually, an aircraft or a spacecraft is provided with a SAR imaging system which transmits radar pulses and collects radar echoes corresponding to the radar pulses reflected by an object to be imaged.

Interferometric SAR techniques have also been developed for generating 3D images of a scanned object. In an example of such interferometric techniques, two optical SAR images are generated and optically combined in order to produce their interference fringes. The phase information related to the third dimension of the fringes can be extracted. The two optical images are representations of a same target area from different angles of view. Such interferometric SAR systems require the simultaneous generation of the two optical SAR images and therefore two optical SAR processors are required. In another example, two optical SAR images are superimposed on a photosensitive film. The photosensitive film is then developed and a SAR interference image is created by illuminating the developed photosensitive film. Such interferometric techniques require additional equipment, thereby increasing the overall weight and size of the SAR raw data processing system.

Therefore there is a need for an improved method and apparatus for generating a 3D image or pattern in a SAR imaging system.

SUMMARY

In accordance with a first broad aspect, there is provided a method for generating a synthetic aperture image of a target area, comprising: receiving, from a synthetic aperture imaging system, first raw data representative of electromagnetic signals reflected by the target area and detected by the synthetic aperture imaging system according to a first angle of view; digitally combining the first raw data with second raw data, thereby obtaining combined data, the second raw data being representative of the electromagnetic signals reflected by the target area and detected by the synthetic aperture imaging system according to a second angle of view different from the first angle of view; and generating an interference pattern of the target data using the combined data.

In accordance with a second broad aspect, there is provided a system for generating a synthetic aperture image of a target area, comprising: a memory for storing first raw data representative of electromagnetic signals reflected by a target area and detected by a synthetic aperture imaging system according to a first angle of view, and second set of raw data representative of the electromagnetic signals reflected by the target area and detected by the synthetic aperture imaging system according to a second angle of view different from the first angle of view; a data combiner module adapted to combine the first raw data with the second raw data in order to obtain combined data; and a pattern generator adapted to generate an interference pattern of the target data using the combined data.

DESCRIPTION

Figure 1:
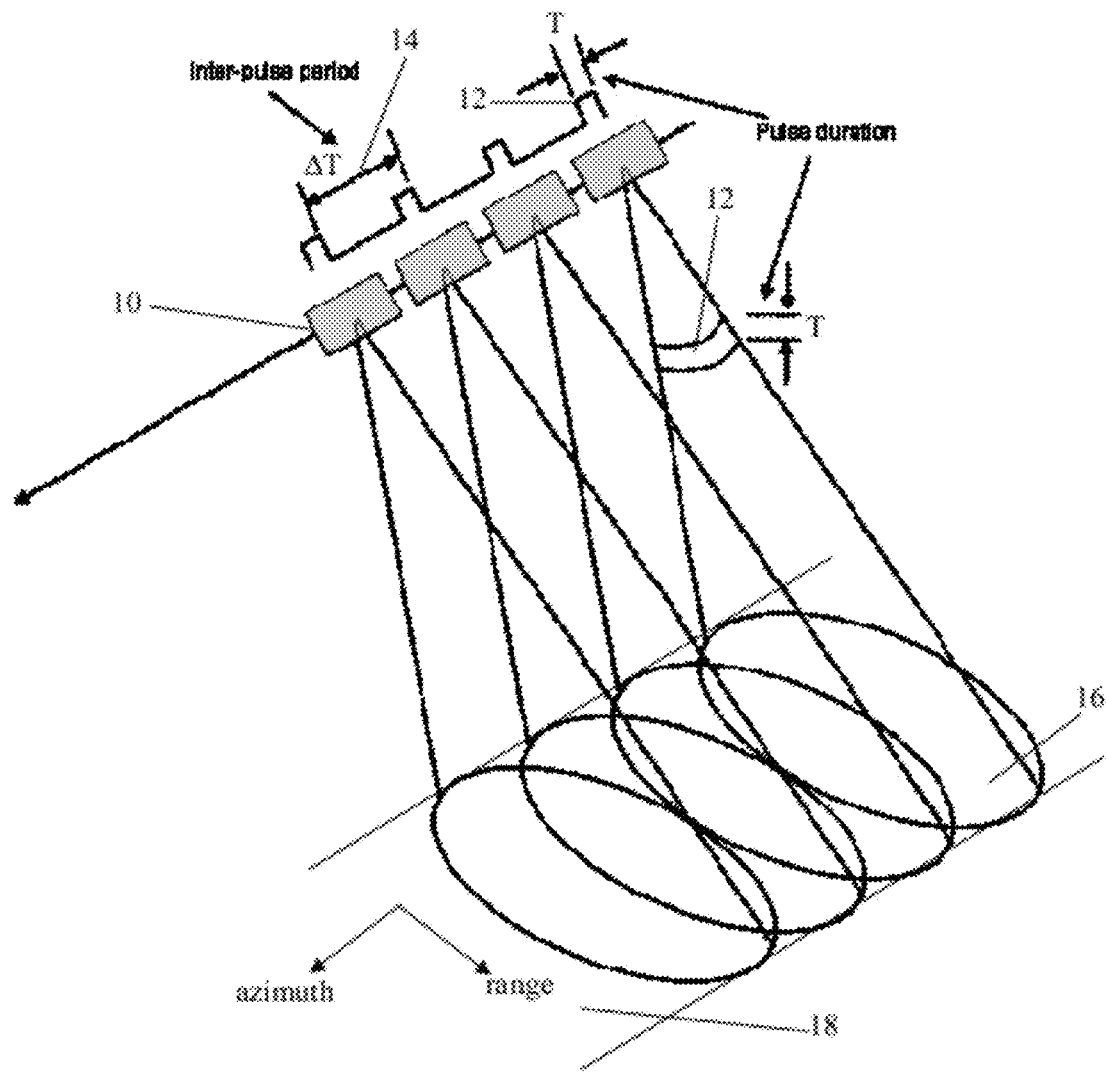
FIG. 1 illustrates a SAR imaging system for imaging a target area, in accordance with an embodiment.

FIG. 1 illustrates one embodiment of a satellite 10 provided with a SAR imaging system. The satellite 10 is in orbit around an object to be imaged, such as a planet for example. The satellite 10 is traveling along a satellite flight path while imaging the planet. The SAR imaging system is adapted to emit successive electromagnetic radar pulses 12 in direction of the planet. Each radar pulse 12 is characterized by a pulse duration T and two successive radar pulses 12 are temporally spaced apart by an inter-pulse duration $\Delta T$. The pulse duration T and the inter-pulse duration $\Delta T$ defines a pulse repetition frequency which corresponds to the repetition rate of the outgoing radar pulses 12. The emitted radar pulses 12 form a radar beam 14 which illuminates the target area to be imaged. The area of the planet ground which intersects the radar beam is referred to as the footprint 16 of the radar beam. While FIG. 1 illustrates an oval footprint 16, it should be understood that the footprint 16 may have other shape. For example, the footprint 16 may be round. While the satellite 10 is moving along the satellite flight path, the footprint 16 is moving, thereby defining a swath 18. The swath 18 is characterized by a length in an azimuth direction and a width in a range direction. The azimuth direction corresponds to the propagation direction of the radar beam 14, i.e. the flight path direction, and the range direction is the direction normal to the azimuth direction. When reaching the ground, the radar pulses 12 are reflected to give rise to radar echoes. The radar echoes are collected by the SAR system and processed in order to generate a radar image of the target area.

The SAR system mounted to the satellite 10 is provided with at least one emitting antenna for emitting the pulses 12. The emitting antenna can be used for detecting the radar echoes reflected by the ground. Alternatively, at least one receiving antenna different from the emitting antenna can be used for collecting the radar echoes.

A SAR image is generated by superposing a plurality of radar echoes within the range and azimuth of the SAR antenna footprint 16. The received echoes are converted into electrical signals which are referred to as SAR raw data. Alternatively, the electrical signals may be subsequently converted into digital data, which are also referred to as the SAR raw data. The SAR raw data is then processed to create the SAR image of the illuminated target area. A high resolution in the azimuth direction is achieved by applying SAR signal processing without requiring large antennas. The SAR signal processing allows synthesizing a large aperture antenna. SAR signal processing can be mathematically described as a correlation or a filtering process on all of the radar echoes received during an aperture time.

Figure 2:
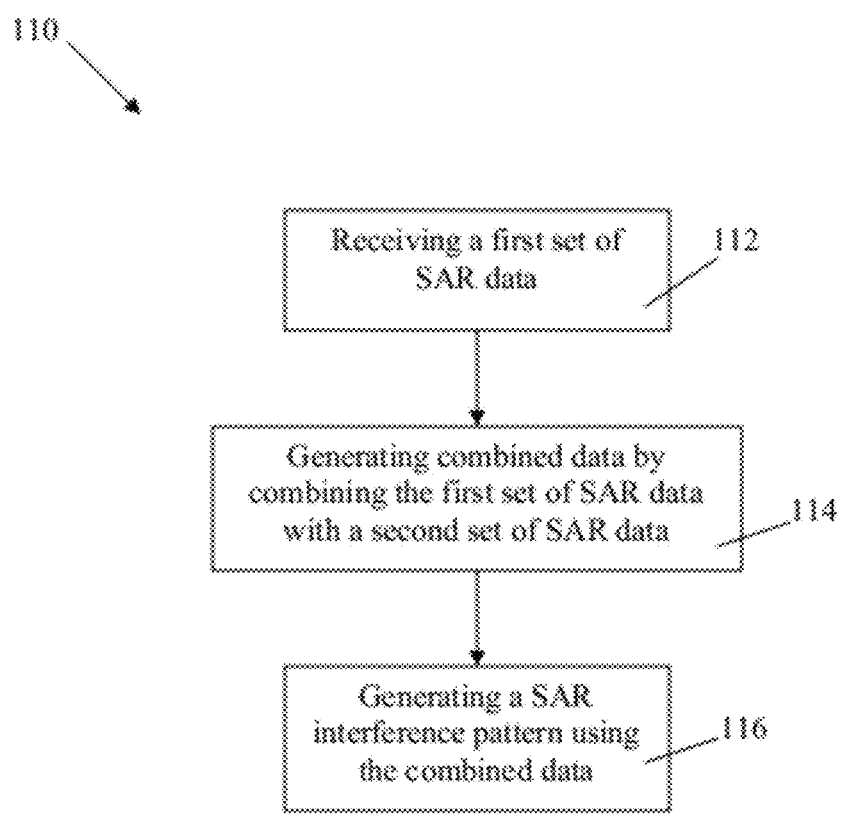
FIG. 2 is a flow chart illustrating a method for generating a SAR interference pattern, in accordance with an embodiment.

FIG. 2 illustrates one embodiment of a method 110 for generating a SAR interference 3D pattern of a target area using SAR raw data generated by a SAR imaging system. The SAR imaging system comprises at least a first and a second receiver antenna located at different positions within the SAR imaging system such that the receiver antennas have different angles of views of the target area to be imaged. Alternatively, two acquisitions from the same antenna at two different positions/times can be used. The first step 112 comprises receiving first SAR raw data. The first SAR raw data is representative of electromagnetic signals reflected by the target area and detected by the first receiver antenna according to a first angle of view. The second step 114 of the method 110 comprises combining the first SAR raw data with second SAR raw data in order to obtain SAR combined raw data. The second SAR raw data is representative of the electromagnetic signals reflected by the target area and detected by the second receiver antenna (or alternatively the same antenna) having a second angle of view of the target area. Combining the first and second SAR raw data together comprises performing an addition of the first SAR raw data $hh_1(x, y)$ to the second SAR raw data $hh_2(x, y)$ in order to obtain combined raw data $kk(x, y)$, as illustrated below:

$$kk(x, y) = hh_1(x, y) + hh_2(x, y)$$

$$kk(x, y) = |hh_1(x, y)|\exp[j\psi\psi_1(x, y)] + |hh_2(x, y)|\exp[j\psi\psi_2(x, y)]$$

where $|hh_1(x, y)|$, $|hh_2(x, y)|$, $\psi\psi_1(x, y)$, and $\psi\psi_2(x, y)$ respectively represent the amplitude of the first raw data, the amplitude of the second raw data, the phase of the first raw data, and the phase of the second raw data.

The last step 116 of the method 110 comprises generating a SAR interference pattern of the target area using the combined SAR data. Any adequate method for generating a SAR pattern using SAR raw data can be used for generating the interference SAR pattern.

In one embodiment, the method 100 further comprises the step of reconstructing a 3D image of the target area using the SAR interference pattern generated at step 116. Any adequate method for reconstructing an image from an interference pattern may be used.

In one embodiment, step 116 of generating the SAR interference pattern using the interference SAR data comprises digitally generating the SAR interference pattern using the combined SAR data. Any adequate digital method for generating a SAR pattern using SAR data can be used. Examples of adequate digital methods comprise the range/Doppler method, the wavenumber method, the chirp-scaling method, the plane-wave approximation method, and the like.

In another embodiment, step 116 of generating the SAR interference pattern using the combined SAR data comprises optically generating the SAR interference pattern using the combined SAR data. Any adequate optical methods for generating a SAR pattern using SAR data can be used. The SAR interference pattern is generated by creating an optical image of the combined SAR data and optically processing the image of the combined SAR data.

In one embodiment, the optical image of the combined SAR data is created using a light modulator such as a spatial light modulator (SLM) or a micro display. The light modulator comprises addressable pixels organized in rows along a first axis representing the azimuth and in columns along a second axis representing the range. The transmittance of each pixel of the light modulator is controlled in accordance with the amplitude and/or phase of the corresponding combined SAR data value. A coherent light such as a laser light is generated and illuminates the light modulator. The incident laser light is modulated by the light modulator and an optical image of the interference SAR data is generated at the output of the light modulator. The optical image of the combined SAR data is then optically processed to reconstruct the SAR interference pattern of the target area. The reconstructed SAR interference pattern can be projected on a screen. Alternatively, an optical sensor such as a charge-coupled device (CCD) or a complementary metal-oxide-semiconductor (CMOS) sensor, for example, can be used to convert the optical SAR pattern of the target area into a digital SAR interference pattern of the target area which can be recorded in a memory or sent to a base station, for example.

In one embodiment, the SLM comprises two SLMs mapped one onto the other. The transmittance of the pixels of the first SLM is set in accordance with the amplitude of the combined SAR data points and the transmittance of the pixels of the second SLM is set in accordance with the phase of the combined SAR data points, or vice versa.

Figure 3A:
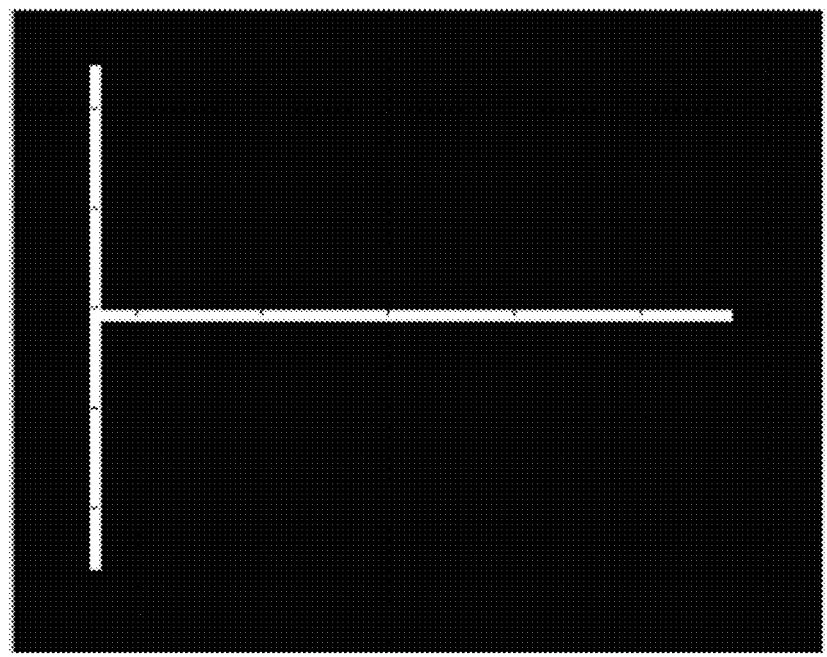
FIGS. 3A and 3B illustrate a graphical representation of an amplitude and a phase of a first SAR target, respectively.
Figure 3B:
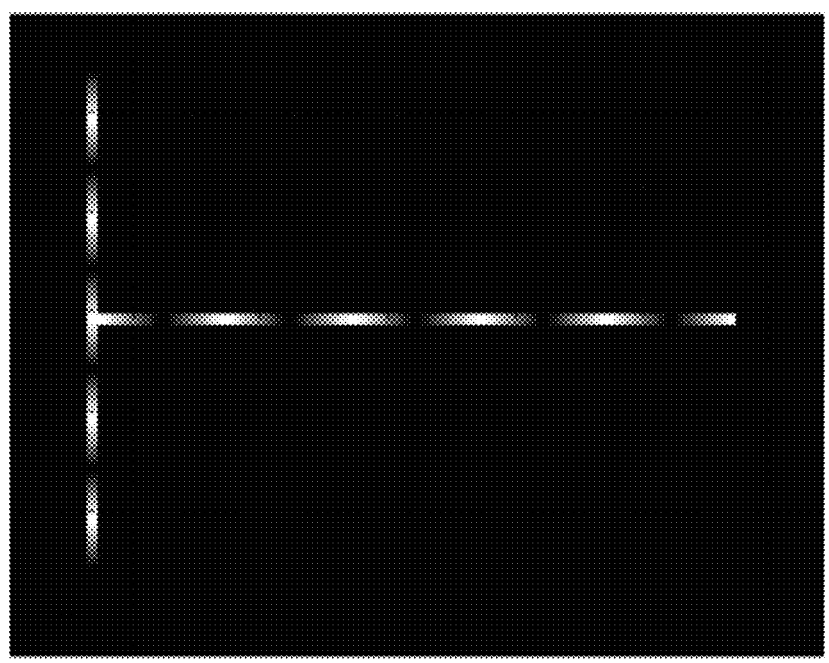
Figure 4:
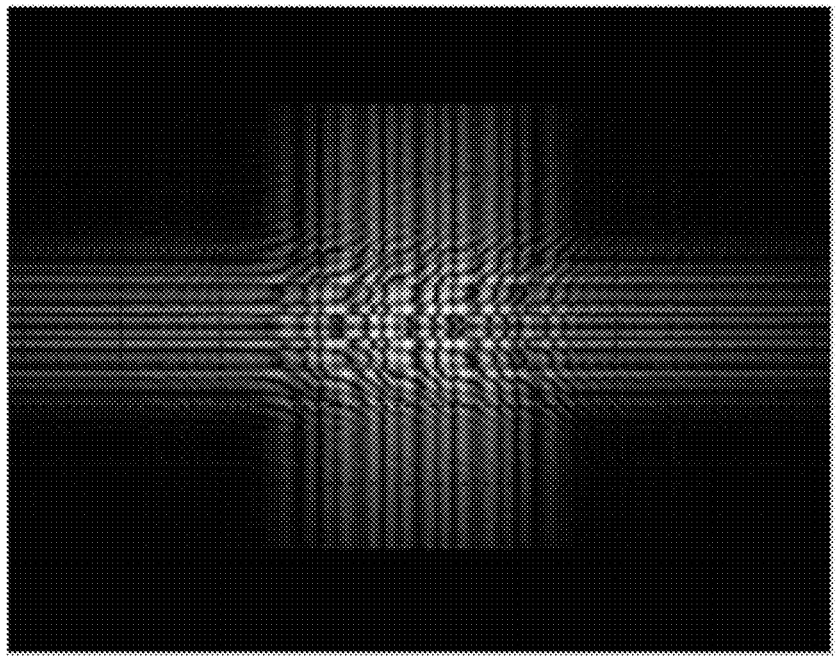
FIG. 4 illustrates a graphical SAR raw data representation of a combination of the amplitude and phase of the first SAR target illustrated in FIGS. 3A and 3B, respectively.

FIGS. 3a and 3b graphically illustrate the amplitude and phase of a first SAR target, respectively. The first SAR raw data are generated by a SAR imaging system according to a first receiver antenna having a first angle of view of the target area to be imaged. FIG. 4 graphically illustrates the first SAR raw data when both the amplitude information and the phase information graphically illustrated in FIGS. 3a and 3b respectively, are combined together.

Figure 5:
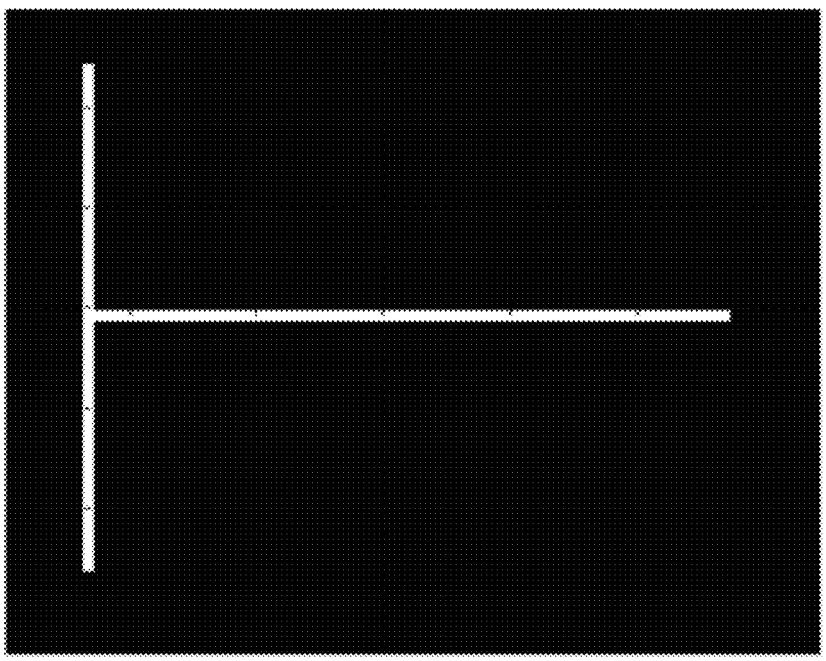
FIG. 5 illustrates a graphical representation of an amplitude and a phase of a second SAR target.
Figure 6:
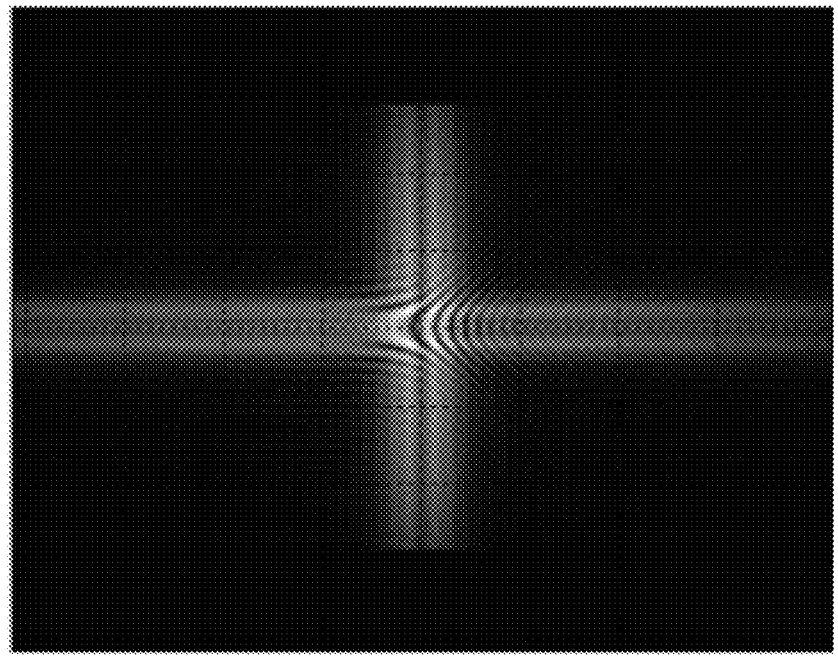
FIG. 6 illustrates a graphical SAR raw data representation of a combination of the phase and the amplitude of the second SAR raw data illustrated in FIG. 5.

FIG. 5 graphically illustrates the amplitude and phase (both constant) of a second SAR target viewed by the SAR imaging system according to a second angle of view. FIG. 6 graphically illustrates the second SAR raw data when both the amplitude information and the phase information are combined together.

Figure 7:
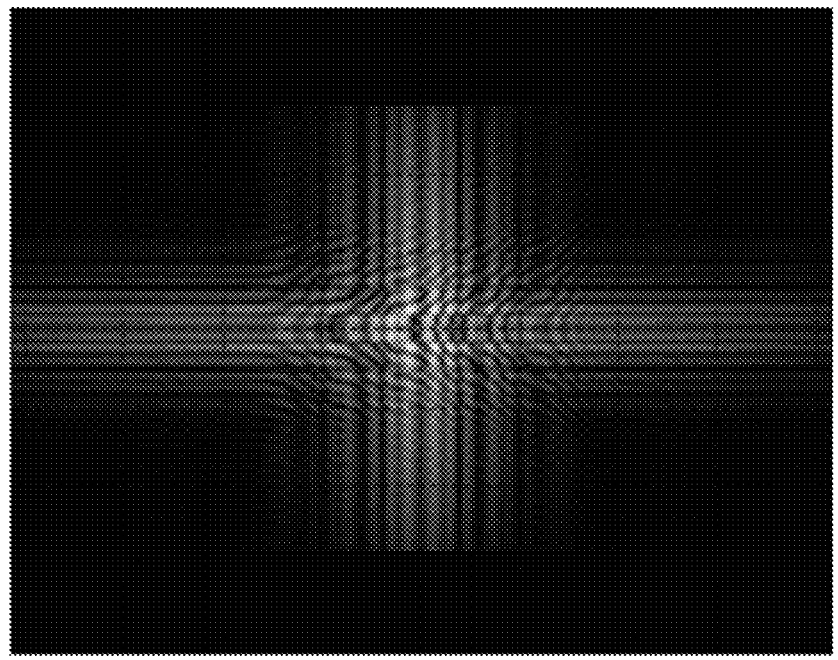
FIG. 7 illustrates a graphical representation of the combination of the first SAR raw data of FIG. 4 with the second SAR raw data of FIG. 6.
Figure 8:
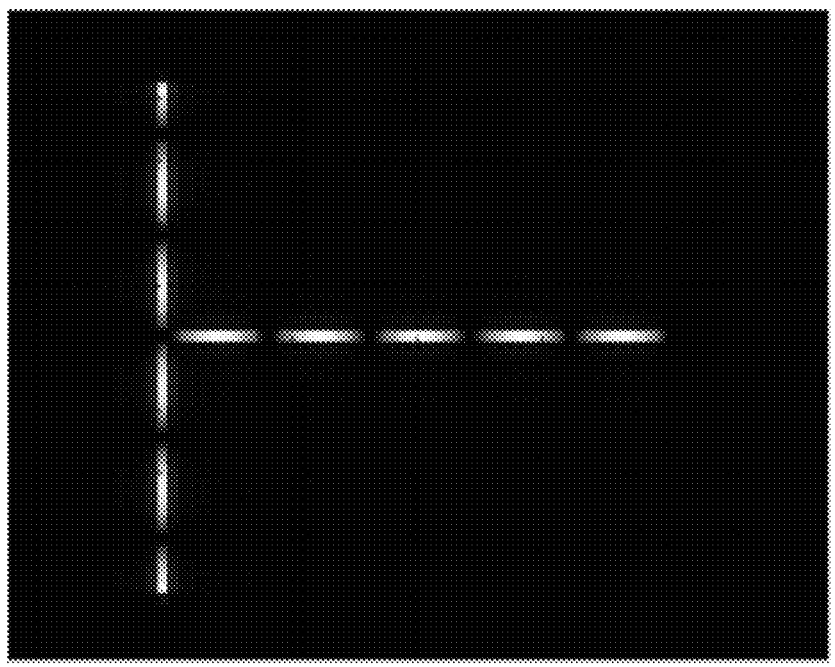
FIG. 8 illustrates a first SAR interference pattern resulting from a reconstruction of the first combined SAR data of FIG. 7.

The first SAR raw data and the second SAR raw data illustrated in FIGS. 4 and 6, respectively, are digitally combined together in accordance with the method illustrated above. FIG. 7 graphically illustrates the combined SAR data resulting from the combination of the first SAR raw data with the second SAR raw data. The SAR interference pattern illustrated in FIG. 8 is generated using the combined SAR raw data. The interference SAR pattern can be generated using any adequate method for generating a SAR image from SAR raw data, such as the digital and optical methods illustrated above.

In one embodiment, the second set of SAR raw data is not received from the SAR imaging system but generated using the first SAR raw data. The second SAR raw data is generated by applying a range and/or azimuth shift to the first SAR raw data. The first SAR raw data is graphically represented by a SAR pattern. First SAR raw data points forming the SAR pattern are organized in rows along the azimuth axis and in columns along the range axis. Each first SAR raw data point is associated with an amplitude value and a phase value. In this case, the step of applying a range and/or azimuth shift to the first SAR raw data pattern comprises determining a range and/or azimuth shift and shifting the row and/or columns of first SAR raw data points in accordance with the determined range and/or azimuth shift in order to obtain the second SAR raw data. The generated second SAR raw data corresponds to the second angle of view raw data that would have been generated by the SAR imaging system while detecting the electromagnetic signals reflected by the target area with an angle of view different from that associated with the first SAR raw data.

In one embodiment, a trade-off is made between the value of the azimuth and/or range shift and the size of the interference pattern. The more the first SAR raw data are shifted to generate the second SAR raw data, the more important the resulting 3D interference pattern is, but the smaller the size of the resulting 3D pattern is.

Figure 9A:
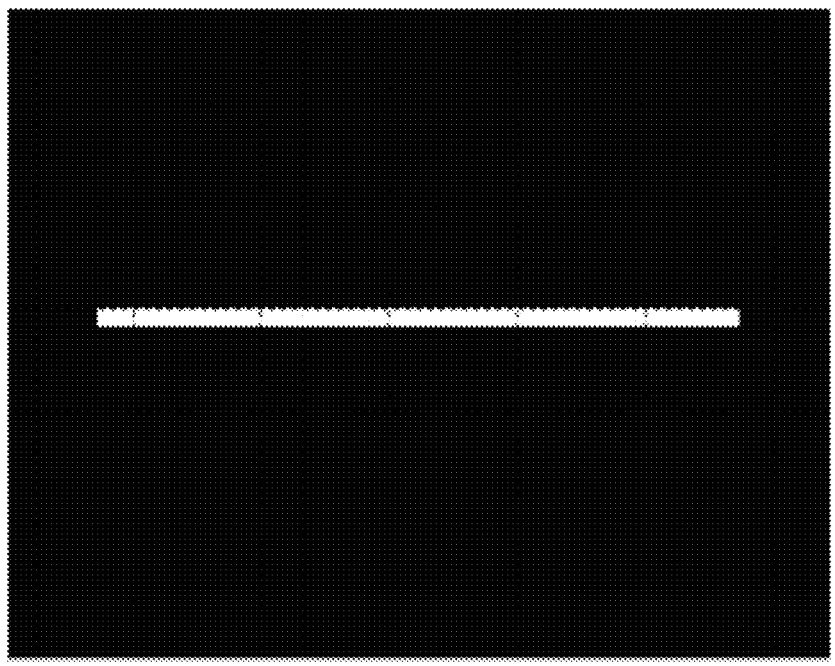
FIGS. 9A and 9B illustrate a graphical representation of an amplitude and a phase of a third SAR target, respectively.
Figure 9B:
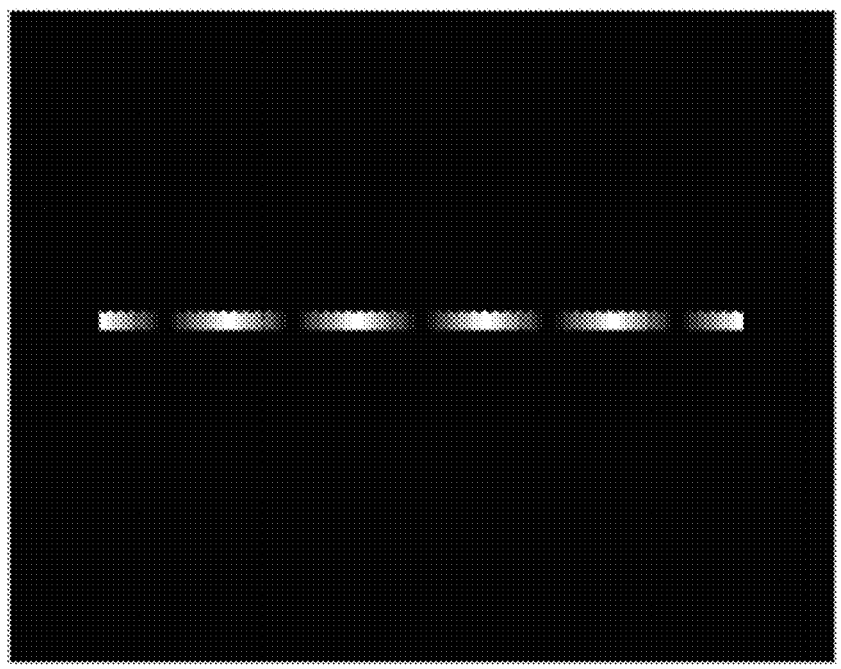

FIGS. 9A and 9B graphically illustrate the amplitude and the phase, respectively, of the first SAR target viewed by a SAR imaging system in accordance with a given angle of view. Second SAR raw data are digitally generated by applying an azimuth shift or a phase factor to the first SAR raw data, in accordance with the method described above. Then the first SAR raw data and the second SAR raw data are combined together in order to obtain combined data and an interference pattern of the target area is generated using the combined data.

Figure 10:
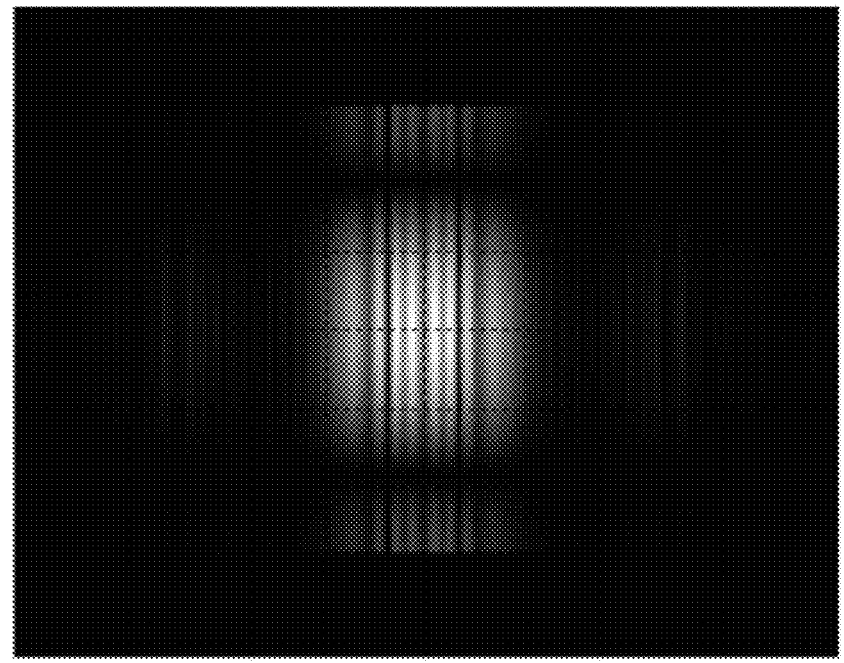
FIG. 10 illustrates a graphical representation of second combined SAR raw data resulting from a combination of third SAR raw data generated from target of FIGS. 9A and 9B with a five-pixel shifted version of the same third SAR raw data.
Figure 11:
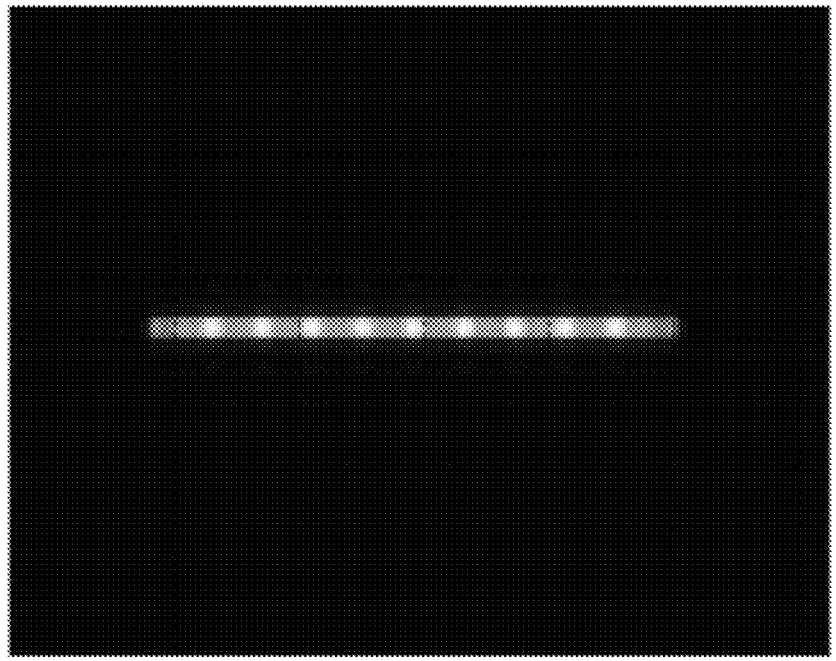
FIG. 11 illustrates a second SAR interference pattern resulting from a reconstruction of the second combined SAR raw data of FIG. 10.

FIG. 10 illustrates the combined data displayed on an SLM when the second SAR raw data are generated by applying a first azimuth shift to the first SAR raw data illustrated in FIGS. 9A and 9B. In this case, the first azimuth shift applied to the first SAR raw data in order to generate the second SAR raw data corresponds to five pixels of the SLM. FIG. 11 illustrates the SAR interference pattern generated from the SAR combined data of FIG. 19 using an optical processor.

Figure 12:
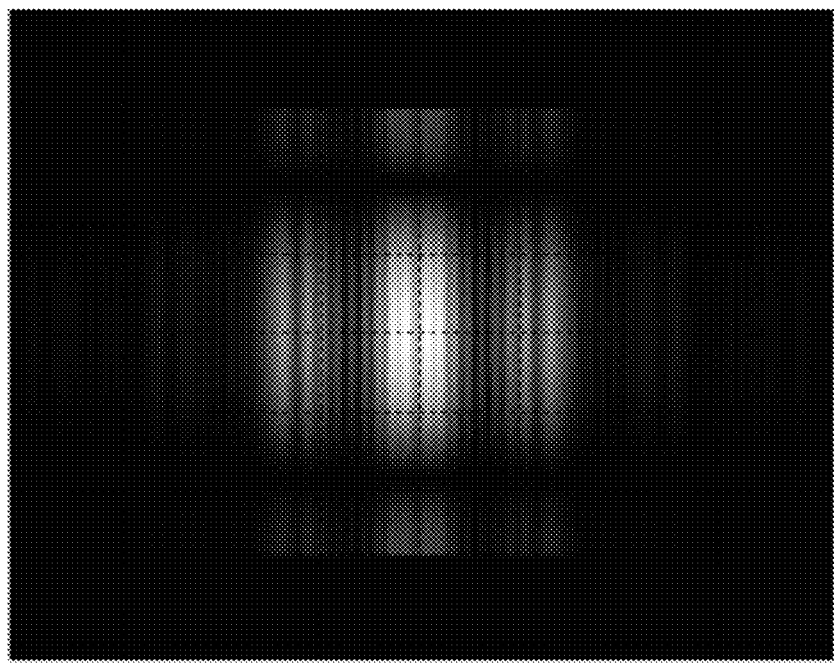
FIG. 12 illustrates a graphical representation of third combined SAR raw data resulting from a combination of the third SAR raw data generated from the target of FIGS. 9A and 9B with a ten-pixel shifted version of the same third SAR raw data.
Figure 13:
FIG. 13 illustrates a third SAR interference pattern resulting from a reconstruction of the third combined SAR raw data of FIG. 12.

FIG. 12 illustrates the combined data displayed on the SLM when the second SAR raw data are generated by applying a second azimuth shift to the first SAR raw data. In this case, the second azimuth shift applied to the first SAR raw data in order to generate the second SAR raw data corresponds to ten pixels of the SLM. FIG. 13 illustrates the interference SAR pattern generated from the SAR combined data of FIG. 12 using a SAR processor.

In one embodiment, at least one of the first and second SAR raw data is scaled such that both first and second SAR raw data are associated with substantially the same Fresnel zone plate focal length. Any adequate method for scaling SAR raw data such as the method described above with respect to the method 20 can be used.

Figure 14:
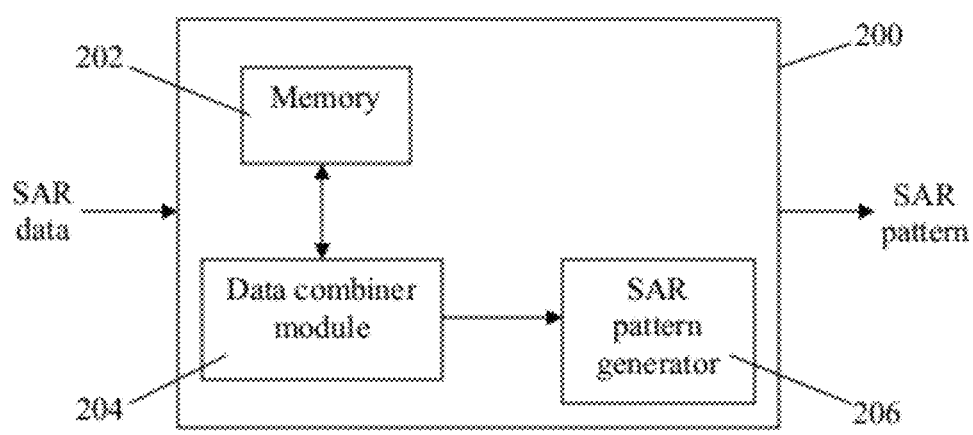
FIG. 14 is a block diagram of a SAR interferometric processing apparatus, in accordance with an embodiment.

FIG. 14 illustrates one embodiment of a SAR image generator 200 which comprises a memory 202, a data combiner module 204, and a SAR interference pattern generator 206. The SAR image generator 200 is adapted to receive at least first SAR raw data generated by a SAR imaging system and corresponding to a first angle of view for the SAR imaging system, and the memory 202 is adapted to store the first SAR raw data and second SAR raw data associated with a second angle of view for the SAR imaging system different from the first angle of view. The data combiner module 204 is adapted to access the first and second SAR raw data stored in the memory 202 and to generate SAR combined data by combining the first and second SAR data together in accordance with the method described above. The SAR combined data are then transmitted to the SAR interference pattern generator 206 which is adapted to generate a SAR interference pattern using the SAR combined data. The SAR interference pattern generator 206 can be any adequate SAR pattern generator adapted to generate a SAR pattern of a target area using SAR raw data generated by any SAR imaging system.

In one embodiment, the SAR interference pattern generator 206 comprises a processing unit adapted to digitally generate a SAR interference pattern of the target area using the SAR combined data. In this case, the SAR interference pattern generator 206 is configured for applying the adequate methods for digitally creating a SAR pattern described above. It should be understood that, when the SAR interference pattern generator 206 is a digital pattern generator, the data combiner module 204 and the SAR interference pattern generator 206 can be embodied in a single module 48 comprising at least one processing unit configured for generating SAR combined data by combining the first and second SAR data together and generate a SAR interference pattern of the SAR combined data.

In another embodiment, the SAR interference pattern generator 206 comprises a coherent light source, a pixel drive unit, a light modulator such as an SLM or a micro display, and an optical processor. Any adequate light modulator can be used. For example, the light modulator can be a liquid crystal display, a micro mirror SLM, an electro-optic SLM, a magneto-optic SLM, or the like. The pixel drive unit is adapted to control the transmittance of each addressable pixel of the light modulator. The pixel drive unit receives the SAR combined data in the form of a complex function or a SAR pattern from the data combiner module 204 or the memory 202, and sets the transmittance of the addressable pixels of the light modulator in accordance with the SAR combined data. The coherent light source emits a coherent light beam which illuminates the light modulator. The coherent light incident to the light modulator is modulated in accordance with the transmittance of the pixels and a modulated light corresponding to an image of the SAR combined data is transmitted at the output of the light modulator. The modulated light then propagates through the optical processor which generates a reconstructed SAR 3D interference pattern of the target area. The SAR 3D pattern can be displayed on a screen. The SAR 3D pattern generator can also be provided with an optical detector or sensor, such as a CCD or a CMOS sensor, for converting the optical image of the pattern into a digital image which can be saved in memory 202.

In one embodiment, the coherent light source comprises a spatial filter to improve the quality of the image. A polarizer may be provided between the light modulator and the coherent light source if the light modulator requires polarized light.

In one embodiment, the optical processor comprises at least one cylindrical lens to selectively focus the azimuth or range field. The cylindrical lens can be used together with a spherical lens to provide focusing power in the azimuth or range direction. The cylindrical lens may also compensate for a chirp along the range direction and/or for a range phase factor along the azimuth direction.

In one embodiment in which the SAR interference pattern generator 206 comprises a light detector, the optical processor can comprise at least one spherical lens for imaging the processed wave to the detector plane of the light detector.

In one embodiment, the interference SAR image generator 200 is adapted to receive the second SAR raw data from the SAR imaging system.

In another embodiment, the data combiner module 204 is further adapted to generate the second SAR raw data from the first SAR raw data by applying a phase factor or an azimuth shift to the first SAR raw data to simulate raw data corresponding to a SAR imaging system angle of view different from that associated with the first SAR raw data. The data combiner module 204 then generates the SAR combined data by combining the first SAR raw data with the generated second SAR raw data.

In one embodiment, the SAR combined data generated by the data combiner module 204 is stored in the memory 202 and the SAR interference pattern generator 206 accesses the SAR combined data from the memory 202. Alternatively, SAR combined data generated by the data combiner module 204 is directly sent to the SAR interference pattern generator 206.

In one embodiment, the data combiner 204 is adapted to scale at least one of the first and second SAR raw data such that both first and second SAR raw data are associated with substantially the same Fresnel zone plate focal length. The data combiner 204 is adapted to use any adequate method for scaling SAR raw data such as the method described above with respect to the method 20.

In an embodiment in which the SAR interference pattern is digitally generated, the data combiner module 204 and the SAR interference pattern generator 206 are embodied as a single module comprising a processing unit configured for performing the steps 114 and 116 of the method 110 described above. The processing unit can also be configured for scaling at least one of the first and second SAR raw data such that both first and second SAR raw data are associated with substantially the same Fresnel zone plate focal length, and/or generate the second SAR raw data from the first SAR raw data by applying a phase factor and/or an azimuth shift to the first SAR raw data.

In one embodiment, the system 200 further comprises a 3D image generator adapted to receive the SAR interference pattern from the SAR interference pattern generator 206 and reconstruct a 3D image of the target area from the SAR interference pattern. Any adequate 3D image generator adapted to generate a 3D image from an interference pattern may be used.

While the present description refers to a synthetic aperture radar, it should be understood that the methods, apparatuses, and systems described above can be applied to any synthetic aperture imaging system. For example, the method 110 and the apparatus 200 can be used with a synthetic aperture SONAR (SAS), a synthetic aperture LIDAR, a synthetic aperture terahertz system, a synthetic aperture infrared system, or the like.

It should be noted that the present invention can be carried out as a method or can be embodied in a system or an apparatus. The embodiments of the invention described above are intended to be exemplary only. The scope of the invention is therefore intended to be limited solely by the scope of the appended claims.

The invention claimed is:

1. A method for generating a synthetic aperture image of a target area, comprising:
   receiving, from a synthetic aperture imaging system, first raw data representative of electromagnetic signals reflected by said target area and detected by said synthetic aperture imaging system according to a first angle of view;
   digitally combining said first raw data with second raw data, thereby obtaining combined data, said second raw data being representative of said electromagnetic signals reflected by said target area and detected by said synthetic aperture imaging system according to a second angle of view different from said first angle of view; and
   generating an interference pattern of said target area using said combined data, said generating comprising the steps of:
   generating an incident light;
   modulating said incident light with a light modulator comprising addressable pixels organized in rows and in columns, said pixels having a transmittance controlled in accordance with at least one of an amplitude and a phase of said combined data, thereby obtaining a modulated light; and
   optically processing said modulated light, thereby obtaining an optical image of said interference pattern of said target area.

2. The method as claimed in claim 1, further comprising receiving said second raw data from a synthetic aperture imaging system.

3. The method as claimed in claim 1, further comprising generating said second raw data by applying at least one of an azimuth shift and a range shift to said first raw data.

4. The method as claimed in claim 1, further comprising scaling at least one of said first raw data and said second raw data so that said first raw data and said second raw data are associated with substantially a same Fresnel zone plate focal length of said synthetic aperture imaging system.

5. The method as claimed in claim 1, further comprising optically detecting said optical image to generate a digital image of said interference pattern of said target area.

6. The method as claimed in claim 1, wherein said receiving said first raw data comprises receiving said first raw data from one of a synthetic aperture radar system, a synthetic aperture sonar system, a synthetic aperture lidar system, a synthetic aperture terahertz system, and a synthetic aperture infrared system.

7. The method as claimed in claim 1, further comprising generating a 3D image of said target area from said interference pattern.

8. A system for generating a synthetic aperture image of a target area, comprising:
   a memory for storing first raw data representative of electromagnetic signals reflected by a target area and detected by a synthetic aperture imaging system according to a first angle of view, and second set of raw data representative of said electromagnetic signals reflected by said target area and detected by said synthetic aperture imaging system according to a second angle of view different from said first angle of view;

a data combiner module adapted to combine said first raw data with said second raw data in order to obtain combined data; and a pattern generator adapted to generate an interference pattern of said target area using said combined data, said pattern generator comprising:

a light source for generating an incident light;

a light modulator comprising addressable pixels organized in rows and in columns, said pixels having a transmittance controlled in accordance with at least one of an amplitude and a phase of said combined data in order to obtain a modulated light; and an optical processor for optically processing said modulated light in order to obtain an optical image of said interference pattern of said target area.

9. The system as claimed in claim 8, wherein said data combiner module is adapted to generate said second raw data by applying at least one of an azimuth shift and a range shift to said first raw data.

10. The system as claimed in claim 8, wherein said data combiner module is adapted to scale at least one of said first raw data and said second raw data so that said first raw data and said second raw data are associated with substantially a same Fresnel zone plate focal length of said synthetic aperture imaging system.

11. The system as claimed in claim 8, further comprising an optical sensor for detecting said optical image and generating a digital image of said interference pattern of said target area.

12. The system as claimed in claim 8, wherein said memory is adapted to receive said first raw data from one of a synthetic aperture radar system, a synthetic aperture sonar system, a synthetic aperture lidar system, a synthetic aperture terahertz system, and a synthetic aperture infrared system.

13. The system as claimed in claim 8, further comprising a 3D image generator adapted to generate a 3D image of said target area from said interference pattern.

* * * * *